(12) United States Patent
Takamatsu (10) Patent No.: US 11,758,066 B2
(45) Date of Patent: Sep. 12, 2023

(54) IMAGE READING DEVICE AND WIRING METHOD

(71) Applicant: Seiko Epson Corporation, Tokyo (JP)

(72) Inventor: Seiji Takamatsu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 10 days.

(21) Appl. No.: 17/493,007

(22) Filed: Oct. 4, 2021

(65) Prior Publication Data

US 2022/0109773 A1    Apr. 7, 2022

(30) Foreign Application Priority Data

Oct. 7, 2020 (JP) .................. 2020-169607

(51) Int. Cl.
*H01B 7/08* (2006.01)
*H04N 1/00* (2006.01)
*H01B 7/04* (2006.01)

(52) U.S. Cl.
CPC ......... *H04N 1/00907* (2013.01); *H01B 7/041* (2013.01); *H01B 7/08* (2013.01)

(58) Field of Classification Search
CPC ................... H01B 7/08; H04N 1/04
See application file for complete search history.

(56) References Cited

U.S. PATENT DOCUMENTS

| 11,133,119 | B2 * | 9/2021 | Akagi | G03G 15/6535 |
| 2017/0005424 | A1 * | 1/2017 | Lee | H01R 12/775 |
| 2017/0039402 | A1 * | 2/2017 | Iannotti | G06K 7/10198 |
| 2019/0289164 | A1 * | 9/2019 | Nakayoshi | H04N 1/3263 |
| 2020/0382016 | A1 * | 12/2020 | Wen | H02M 1/08 |

FOREIGN PATENT DOCUMENTS

JP    2016-179367    10/2016

* cited by examiner

*Primary Examiner* — Chau N Nguyen
(74) *Attorney, Agent, or Firm* — WORKMAN NYDEGGER (57) ABSTRACT

An FFC coupling a sensor substrate and an AFE substrate includes a configuration in which a ground line is sandwiched between a first lead wire and a second lead wire that are signal lines that transmit a read signal from the sensor substrate to the AFE substrate, and includes a configuration in which a third lead wire having a smaller voltage change than the signal line is sandwiched between two signal lines that are at least one set other than a set of the first lead wire and the second lead wire, wherein each of the signal lines is coupled to a ground pattern of the sensor substrate and is coupled to a ground pattern of the AFE substrate, and the third lead wire is coupled to a ground pattern of the sensor substrate and is coupled to a ground pattern of the AFE substrate.

8 Claims, 7 Drawing Sheets

IMAGE READING DEVICE AND WIRING METHOD

The present application is based on, and claims priority from JP Application Serial Number 2020-169607, filed Oct. 7, 2020, the disclosure of which is hereby incorporated by reference herein in its entirety.

BACKGROUND

1. Technical Field

The present disclosure relates to an image reading device and a wiring method.

2. Related Art

In a case where a flexible flat cable (FFC) is used to route a plurality of signal lines in proximity, it is known that a magnetic field generated by a signal transmitted by a certain signal line affects a signal transmitted on another signal line, and noise and crosstalk are generated (see JP-A-2016-179367). In an image reading device, such noise and crosstalk are represented as a deterioration of a read signal as a result of reading an original document.

Measures for crosstalk, etc. described above include suppressing mutual induction between signal lines by sandwiching both sides thereof with ground lines for each signal line. However, in this manner, it is necessary to increase a number of the ground lines in accordance with a number of the signal lines, making it difficult to reduce the size of FFC and the product using the FFC.

SUMMARY

An image reading device includes a sensor substrate including a sensor for image reading, an AFE substrate including an analog front end (hereinafter AFE) configured to receive and process a read signal output from the sensor, a FFC including a plurality of lead wires arranged in a width direction intersecting with a longitudinal direction, the FFC being configured to couple the sensor substrate and the AFE substrate, wherein the FFC includes a configuration in which a ground line that is one of the plurality of lead wires and coupled to a ground pattern included in the sensor substrate and the AFE substrate is sandwiched between a first lead wire and a second lead wire that are signal lines among the plurality of lead wires that transmit a read signal from the sensor substrate to the AFE substrate, and includes a configuration in which a third lead wire that is one of the plurality of lead wires and having a smaller voltage change than the signal lines is sandwiched between two signal lines that are at least one set other than a set of the first lead wire and the second lead wire among the plurality of lead wires, each of the signal lines is coupled to a ground pattern of the sensor substrate via a capacitor and is coupled to a ground pattern of the AFE substrate via a capacitor, and the third lead wire is coupled to a ground pattern of the sensor substrate via a capacitor and is coupled to a ground pattern of the AFE substrate via a capacitor.

A wiring method for coupling, with a FFC, a sensor substrate including a sensor for image reading and an AFE substrate having an AFE configured to receive and process a read signal output from the sensor, the FFC being configured by a plurality of lead wires arranged in a width direction intersecting with a longitudinal direction, wherein the method including configuring the FFC so that a ground line that is one of the plurality of lead wires and coupled to a ground pattern included in the sensor substrate and the AFE substrate is sandwiched between a first lead wire and a second lead wire that are signal lines among the plurality of lead wires that transmit a read signal from the sensor substrate to the AFE substrate, and a third lead wire that is one of the plurality of lead wires and having a smaller voltage change than the signal lines is sandwiched between two signal lines that are at least one set other than a set of the first lead wire and the second lead wire among the plurality of lead wires, coupling each of the signal lines to a ground pattern of the sensor substrate via a capacitor and to a ground pattern of the AFE substrate via a capacitor, and coupling the third lead wire to a ground pattern of the sensor substrate via a capacitor and to a ground pattern of the AFE substrate via a capacitor.

DESCRIPTION OF EXEMPLARY EMBODIMENTS

Exemplary embodiments of the present disclosure will be described below with reference to the accompanying drawings. Note that each of the drawings is merely illustrative for describing the exemplary embodiment. Since the drawings are illustrative, proportions and shapes may not be precise, match each other, or some may be omitted.

Figure 1:
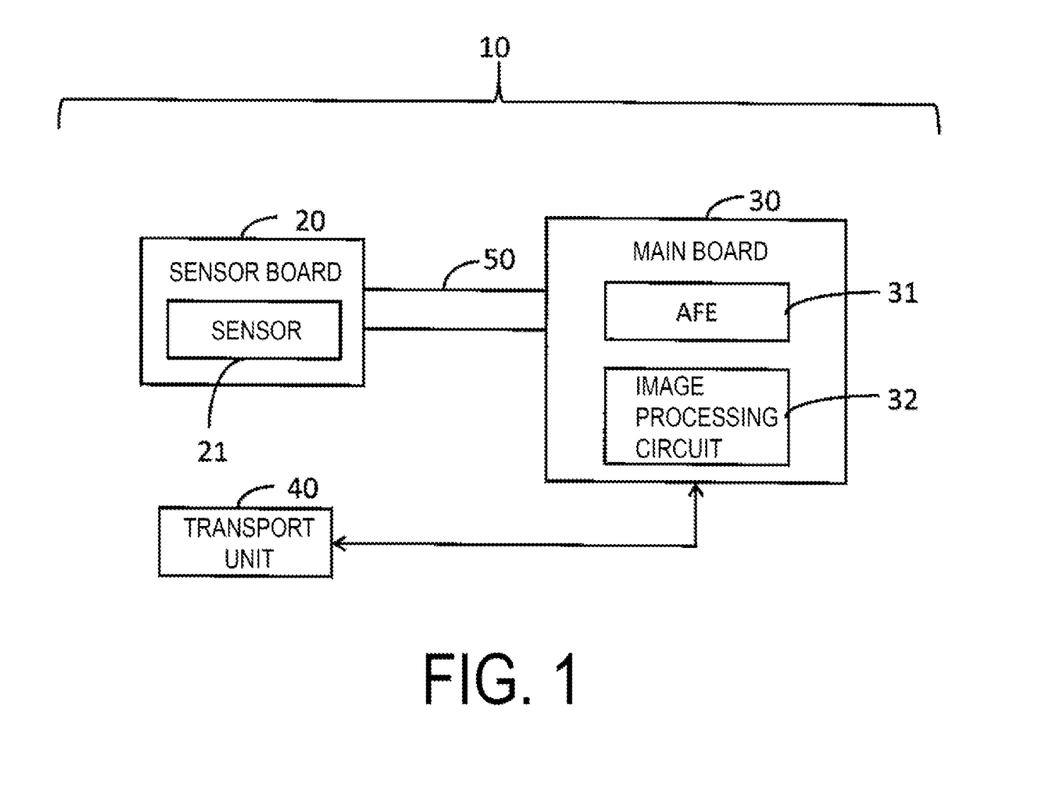
FIG. 1 is a block diagram simply illustrating an image reading device.

1. Outline of a Device Configuration:

FIG. 1 simply illustrates a configuration of an image reading device 10 according to the present exemplary embodiment by a block diagram. The image reading device 10 is also referred to as a scanner. The image reading device 10 has a sensor substrate 20 at which a sensor 21 for image reading is mounted. The sensor 21 is a circuit configured to include a plurality of sensor chips. The plurality of sensor chips, for example, constitute a line sensor in one dimension, and read an original document to be read. Each sensor chip has a plurality of photoelectric conversion elements and outputs a read signal by each element.

The sensor substrate 20 is coupled to a main board 30 by a FFC 50. The FFC 50 is a cable configured in a flat shape by arranging a plurality of lead wires in a width direction that intersects with a longitudinal direction of the cable. A lead wire may be described as a conductor, an electrical wire, etc. An AFE 31 and an image processing circuit 32 are mounted on the main board 30. The main board 30 corresponds to an "AFE substrate" in that it has the AFE 31. Of course, a board having the AFE 31 and a board having the image processing circuit 32 may be separate boards as actual conditions. Hereinafter, the main board 30 having the AFE 31 is also referred to as an AFE substrate 30.

The AFE 31 is a circuit for receiving and processing the read signal output from the sensor 21. The AFE 31 converts the read signal, which is an analog signal, into digital data handled by the image processing circuit 32 in the subsequent stage by, for example, amplifying, adjusting the waveform, or performing analog to digital conversion, etc. The analog to digital conversion may be performed by the image processing circuit 32. The image processing circuit 32 converts the read signal as digital data into image data of a prescribed format by appropriately performing a correction of brightness and color.

In an example of FIG. 1, the image reading device 10 has a transport unit 40. The transport unit 40 includes a motor, a roller, etc., and transports the original document under control by the main board 30. The original document transported by the transport unit 40 is read by the sensor 21. The image reading device 10 having the transport unit 40 corresponds to a so-called seed feed scanner. However, the image reading device 10 may be a so-called flat bed scanner.

Although not illustrated in FIG. 1, of course, the image reading device 10 has a configuration that a scanner typically has, such as a power supply circuit, a light source that illuminates the original document, a storage device that stores image data, a communication interface that communicates with an external computer, etc., and an operating panel for receiving operations from a user. The image reading device 10 may be a composite machine provided with a plurality of functions such as a copy function, a facsimile function, an e-mail communication function, etc.

Figure 2:
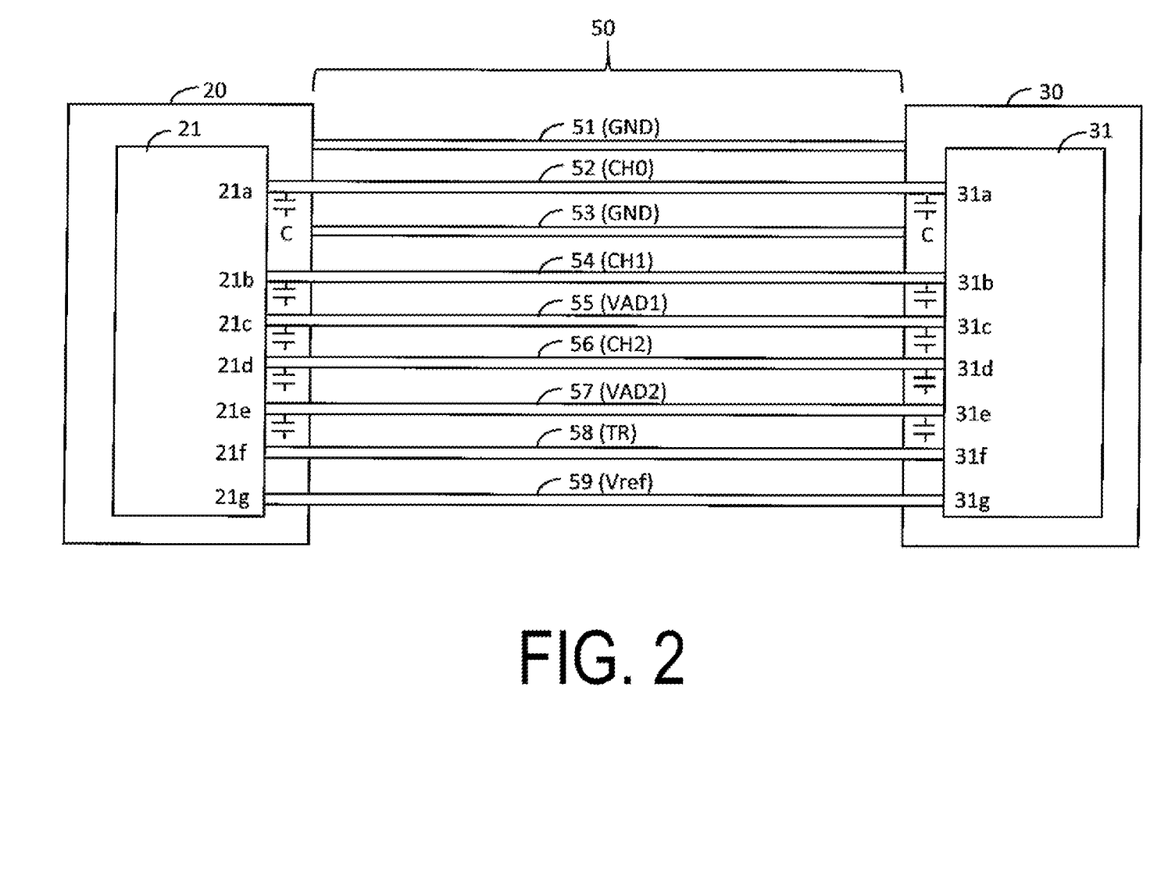
FIG. 2 is a diagram illustrating an example of a wiring method according to the present exemplary embodiment.

2. Wiring Method:

FIG. 2 is a diagram for describing an example of a wiring method according to the present exemplary embodiment. One end of the FFC 50 is coupled to the AFE substrate 30 via a connector (not illustrated) mounted on the AFE substrate 30, and another end of the FFC 50 is coupled to the sensor substrate 20 via a connector (not illustrated) mounted on the sensor substrate 20. According to FIG. 2, the FFC 50 is constituted by nine lead wires indicated by reference numeral 51, 52, 53, 54, 55, 56, 57, 58, 59 side by side. Although not illustrated in FIG. 2, each lead wire of the FFC 50 is covered with an insulator, etc. and is integrated into a flat shape.

A signal for the role or transmission of each lead wire is illustrated together next to the reference numeral of each lead wire. Each of the lead wires 51, 53 is a ground (GND) line. Each ground line is coupled to a ground pattern included in the sensor substrate 20 and the AFE substrate 30. Although not illustrated, each of the sensor substrate 20 and the AFE substrate 30 has a ground pattern in a required range. Furthermore, the sensor 21 and the AFE 31 are each coupled to the ground pattern by a ground terminal (not illustrated).

Each of the lead wires 52, 54, 56 is a signal line (hereinafter a read signal line) transmitting a read signal from the sensor substrate 20 to the AFE substrate 30. Specifically, the lead wire 52 is a read signal line of channel (CH) 0, the lead wire 54 is a read signal line of CH1, and the lead wire 56 is a read signal line of CH2. In the sensor substrate 20, the lead wire 52 is coupled to a signal terminal 21a of the sensor 21 via a predetermined pattern, the lead wire 54 is coupled to a signal terminal 21b of the sensor 21 via a predetermined pattern, and the lead wire 56 is coupled to a signal terminal 21d of the sensor 21 via a predetermined pattern.

On the other hand, in the AFE substrate 30, the lead wire 52 is coupled to a signal terminal 31a of the AFE 31 via a predetermined pattern, the lead wire 54 is coupled to a signal terminal 31b of the AFE 31 via a predetermined pattern, and the lead wire 56 is coupled to a signal terminal 31d of the AFE 31 via a predetermined pattern.

The sensor 21 separates the plurality of sensor chips into a plurality of channels. Then, the sensor 21 synchronizes the output timing of the read signal from the photoelectric conversion element of each channel between the channels, and outputs the read signal from the signal terminals 21a, 21b, 21d corresponding to each channel.

In other words, the CH0 read signal output from the signal terminal 21a of the sensor 21 is input through the lead wire 52 to the signal terminal 31a of the AFE 31. Similarly, the CH1 read signal output from the signal terminal 21b of the sensor 21 is input through the lead wire 54 to the signal terminal 31b of AFE 31, and the CH2 read signal output from the signal terminal 21d of the sensor 21 is input through the lead wire 56 to the signal terminal 31d of AFE 31. Although FIG. 2 illustrates an example in which a number of channels in the sensor 21 is three, the number of channels is not limited. In either case, a number of the read signal lines is required depending on the number of channels.

The lead wires 55, 57 are power supply lines that supply a power supply voltage for driving from the AFE substrate 30 to the sensor substrate 20. The lead wire 55 supplies a predetermined power supply voltage VAD1, and the lead wire 57 supplies a predetermined power supply voltage VAD2. In the sensor substrate 20, the lead wire 55 is coupled to a power supply terminal 21c of the sensor 21 via a predetermined pattern, and the lead wire 57 is coupled to a power supply terminal 21e of the sensor 21 via a predetermined pattern. On the other hand, in the AFE substrate 30, the lead wire 55 is coupled to a power supply terminal 31c of the AFE 31 via a predetermined pattern, and the lead wire 57 is coupled to a power supply terminal 31e of the AFE 31 via a predetermined pattern.

The lead wire 58 is a shift signal line that supplies a shift signal TR to the sensor substrate 20 from the AFE substrate 30 to take the output timing, etc. of the read signal. The lead wire 58 is coupled to a shift terminal 21f of the sensor 21 via a predetermined pattern in the sensor substrate 20, and is coupled to a shift terminal 31f of the AFE 31 via a predetermined pattern in the AFE substrate 30.

The lead wire 59 is a reference supply line that supplies a reference voltage Vref from the AFE substrate 30 to the sensor substrate 20. The lead wire 59 is coupled to a reference terminal 21g of the sensor 21 via a predetermined pattern in the sensor substrate 20, and is coupled to a reference terminals 31g of the AFE 31 via a predetermined pattern in the AFE substrate 30.

A level of the read signal transmitted to each of the lead wires 52, 54, 56 varies from time to time depending on the amount of light received by the photoelectric conversion element. On the other hand, the power supply voltages VAD1, VAD2, and the reference voltage Vref are each at a predetermined level, and they do not fluctuate or vary almost. Therefore, the lead wires 55, 57, 59 correspond to a "third lead wire" whose voltage change is smaller than that of the lead wires 52, 54, 56, which are the read signal lines.

According to FIG. 2, the FFC 50 includes a configuration in which the lead wire 53, which is a ground line, is sandwiched between the lead wire 52 and the lead wire 54, which are read signal lines. In this manner, the lead wire 52 and the lead wire 54, which are the read signal lines and have a relationship of sandwiching one ground line therebetween, correspond to one of "first lead wire and second lead wire sets". Either of the lead wires 52, 54 may be referred to as the first lead, and both may be referred to as the second lead wire. Furthermore, a combination of wires corresponding to the "first lead wire and second lead wire sets" may be other than a set of the lead wires 52, 54.

In addition, according to FIG. 2, the FFC 50 includes a configuration in which the lead wire 55, which is a power supply line, is sandwiched between the lead wire 54 and the lead wire 56, which are read signal lines. In this manner, the lead wire 54 and the lead wire 56, which are the read signal lines and have a relationship of sandwiching one third lead wire therebetween, correspond to one of "configurations in which the third lead wire is sandwiched between two read signal wires, which is one set other than the first lead wire and second lead wire sets". A combination of the read signal lines sandwiching the third lead wire may also be other than a set of the lead wires 54, 56. The third lead wire disposed and sandwiched between the read signal lines may be a reference supply line rather than a power supply line.

Although the illustration is simplified to a certain degree, the read signal lines such as the lead wires 52, 54, 56 are coupled to the ground pattern of the sensor substrate 20 via a capacitor C, and are coupled to the ground pattern of the AFE substrate 30 via the capacitor C, respectively. The capacitor C is a ceramic capacitor. Similarly, the lead wires 55, 57, which are the third lead wires sandwiched and disposed between the read signal wires, are coupled to the ground pattern of the sensor substrate 20 via the capacitor C, and are coupled to the ground pattern of the AFE substrate 30 via the capacitor C.

According to such a wiring method, a return path is secured for each read signal line. For example, focusing on a relationship between the lead wire 52 that is the read signal line and the lead wire 53 that is the ground line, which are coupled via the capacitor C and the ground pattern, the lead wire 53 is one of the return paths for the lead wire 52. A magnetic field due to a return current flowing through the lead wire 53 as the return path acts to cancel out the magnetic field caused by the read signal flowing through the lead wire 52, thereby suppressing noise and crosstalk to adjacent read signal lines due to the impact of the read signal flowing through the lead wire 52. Similarly, focusing on a relationship between the lead wire 54 that is the read signal line and the lead wire 55 that is the third lead wire, the lead wire 55 is one of the return paths for the lead wire 54. The effect of the return path is as described. Further, focusing on a relationship between the lead wire 56 that is the read signal line and the lead wire 57 that is the third lead wire, the lead wire 57 is one of the return paths for the lead wire 56. As illustrated in FIG. 2, the return path of the ground line or the third lead wire is ensured on both sides of each of the lead wires 52, 54, 56, which are the read signal lines.

Figure 3:
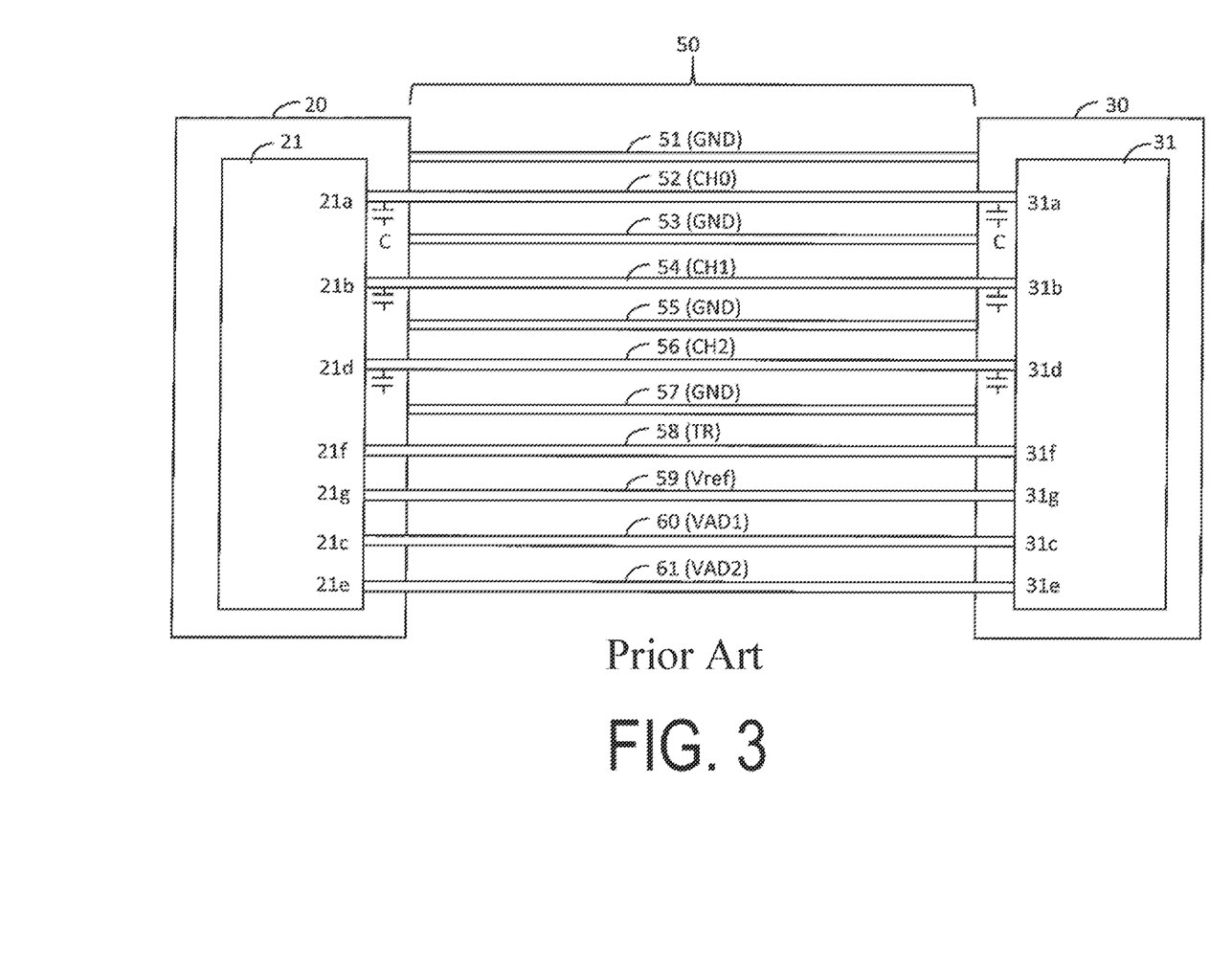
FIG. 3 is a diagram for describing a traditional example.

FIG. 3 is a diagram illustrating a configuration prior to employing the wiring method according to the present exemplary embodiment, i.e. a traditional example. FIG. 2 presents a configuration in which the problem in FIG. 3 is solved. With reference to FIG. 3, the description of the configuration common to FIG. 2 is omitted as appropriate.

According to FIG. 3, the FFC 50 is constituted by eleven lead wires indicated by reference numeral 51, 52, 53, 54, 55, 56, 57, 58, 59, 60, 61 side by side. The lead wires 60, 61 are power supply lines that supply a power supply voltage for driving from the AFE substrate 30 to the sensor substrate 20. The lead wire 60 supplies a predetermined power supply voltage VAD1, and the lead wire 61 supplies a predetermined power supply voltage VAD2. In the sensor substrate 20, the lead wire 60 is coupled to a power supply terminal 21c of the sensor 21 via a predetermined pattern, and the lead wire 61 is coupled to a power supply terminal 21e of the sensor 21 via a predetermined pattern. On the other hand, in the AFE substrate 30, the lead wire 60 is coupled to a power supply terminal 31c of the AFE 31 via a predetermined pattern, and the lead wire 61 is coupled to a power supply terminal 31e of the AFE 31 via a predetermined pattern.

As illustrated in FIG. 3, ground lines are disposed on both sides of each of the lead wires 52, 54, 56, which are the read signal lines. As a result, in the traditional example as well, similar to the present exemplary embodiment, the return path is ensured on both sides of each of the read signal lines, and noise and crosstalk are suppressed. However, in the traditional example, the ground lines were disposed on both sides of all of the read signal wires, so it was necessary to ensure at least one ground line in addition to the number of the read signal lines.

In contrast, in the present exemplary embodiment, by replacing a portion of the lead wires, which were traditionally used as the ground wires, with a power supply line or a reference supply line, it is possible to reduce the number of cores of the FFC 50 and to appropriately secure the return path for each read signal line. Comparing FIG. 2 with FIG. 3, the lead wire 55, which was the ground line, is changed to the power supply line of the power supply voltage VAD1, and the lead wire 57, which was also the ground line, is changed to the power supply line of the power supply voltage VAD2. Thereafter, the lead wires 60, 61 are reduced.

In FIG. 2, the arrangement of the terminals 21a-21g of the sensor 21 and the arrangement of the terminals 31a-31g of the AFE 31 are changed from the arrangement illustrated in FIG. 3 with priority to visibility. However, in FIG. 2, the arrangement of the terminals 21a-21g and the arrangement of the terminals 31a-31g may be the same as in FIG. 3. Then, in the sensor substrate 20, the terminal 21c may be coupled to the lead wire 55 and the terminal 21e may be coupled to the lead wire 57, and in the AFE substrate 30, the terminal 31c may be coupled to the lead wire 55 and the terminal 31e may be coupled to the lead wire 57.

3. Description Relating to a Configuration of a Plurality of Layers:

The FFC 50 may consist of a plurality of layers.

Figure 4A:
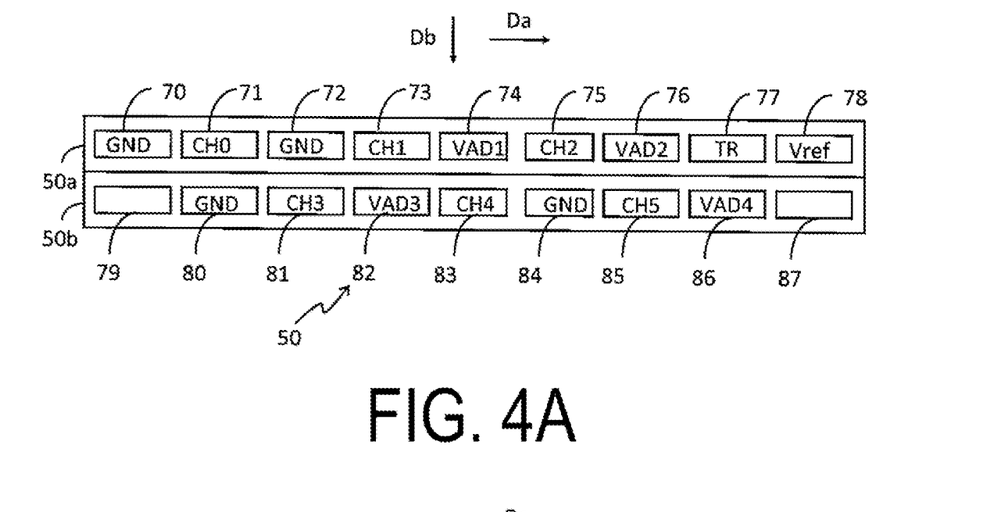
FIG. 4A is a cross-sectional view of a FFC consisting of a plurality of layers.

FIG. 4A illustrates a cross-sectional view of the FFC 50 consisting of the plurality of layers. FIG. 4A is a cross-sectional view taken from a longitudinally oriented view of the FFC 50. The reference numeral Da denotes a width direction Da that intersects with the longitudinal direction of the FFC 50. The reference numeral db denotes a thickness direction db of the FFC 50 that intersects with the longitudinal direction and the width direction Da of the FFC 50. In FIG. 4A, the longitudinal direction of the FFC 50 is a direction perpendicular to the paper surface.

According to FIG. 4A, the FFC 50 is configured by a first layer 50a and a second layer 50b overlapping in the thickness direction db. Each of the first layer 50a and the second layer 50b is the FFC. Since the expression of the first layer and the second layer is only an interrogation name for identifying each layer of the FFC 50, a layer indicated by reference numeral 50a may be referred to as the second layer, and a layer indicated by reference numeral 50b may be referred to as the first layer. Additionally, the number of layers constituting the FFC 50 may be three or greater.

As indicated by reference numeral 70, 71, 72, 73, 74, 75, 76, 77, 78, the first layer 50a has nine lead wires 70~78 arranged in the width direction Da. Also, as indicated by reference numeral 79, 80, 81, 82, 83, 84, 85, 86, 87, the second layer 50b has nine lead wires 79~87 arranged in the width direction Da. In the first layer 50*a*, the ground lines (lead wires 70, 72) and the power supply lines (lead wires 74, 76) are disposed on both sides of each of the lead wires 71, 73, 75, which are the read signal lines, whereby the return path is secured as illustrated in FIG. 2. Moreover, in the second layer 50*b*, the ground lines (lead wires 80, 84) and the power supply lines (lead wires 82, 86) are disposed on both sides of each of the lead wires 81, 83, 85, which are the read signal lines, whereby the return path is similarly secured.

Furthermore, the ground lines (lead wires 80, 84) and the power supply line (lead wire 82) included in the second layer 50*b* are disposed at positions where the ground lines and the power supply line overlap with the read signal lines (lead wires 71, 73, 75) included in the first layer 50*a*. For example, when viewed from the thickness direction db, the lead wire 82 of the second layer 50*b* is disposed at a position where the lead wire 82 overlaps with the lead 73 of the first layer 50*a*. Similarly, the ground line (lead wire 72) and the power supply lines (lead wires 74, 76) included in the first layer 50*a* are disposed at positions where the ground line and the power supply lines overlap with the read signal lines (lead wires 81, 83, 85) included in the second layer 50*b*. For example, when viewed from the thickness direction db, the lead wire 74 of the first layer 50*a* is disposed at a position where the lead wire 74 overlaps with the lead wire 83 of the second layer 50*b*. According to such a configuration, for example, in a case where the FFC 50 has the plurality of layers due to the request for the specifications of the sensor 21 and the AFE 31 and the request for the product assembly process, the return path can be ensured for each read signal line not only in the width direction Da but also at the position in the thickness direction db.

Figure 4B:
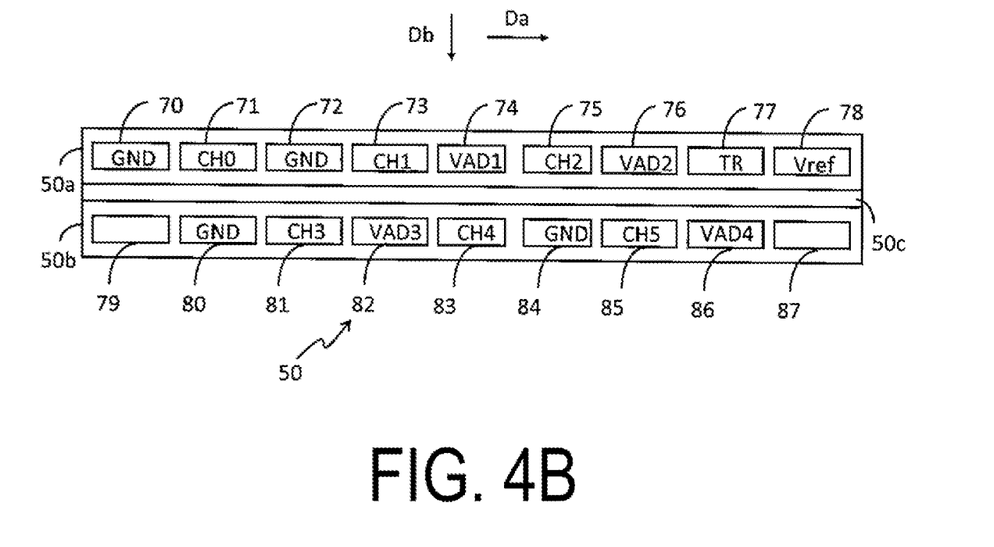
FIG. 4B is a cross-sectional view of an example in which the FFC consists of the plurality of layers and has a spacer between layers thereof.

FIG. 4B illustrates a cross-sectional view of the plurality of layers of the FFC 50 similar to FIG. 4A. The FFC 50 of FIG. 4B differs from FIG. 4A in that it has a spacer 50*c*. In other words, the FFC 50 may have a spacer between layers constituting the plurality of layers. The spacer 50*c* maintains a distance between the first layer 50*a* and the second layer 50*b* in the thickness direction db, and reduces crosstalk and noise effects between both layers.

Figure 5:
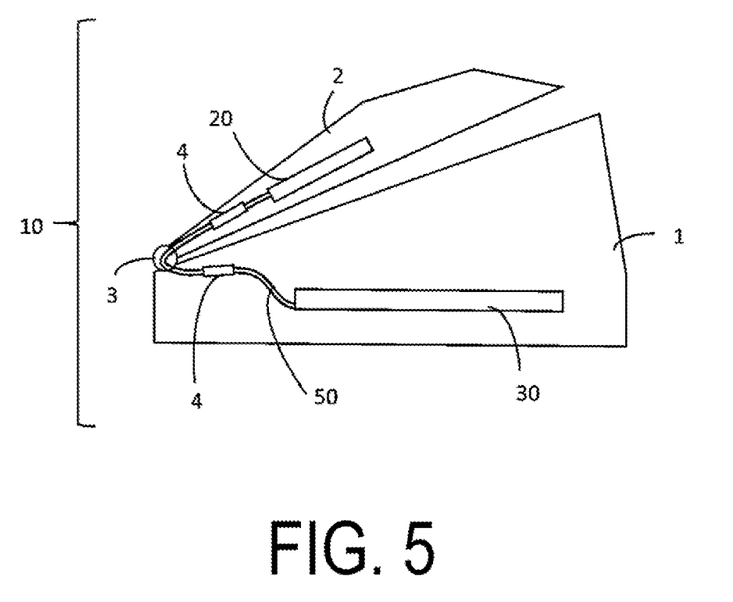
FIG. 5 is a diagram schematically illustrating a structure of the image reading device according to a perspective from a side.

FIG. 5 simply illustrates the structure of the image reading device 10 in view of the view from the side of the device. The image reading device 10 has a first unit 1 and a second unit 2. The first unit 1 may be referred to as a lower unit and the second unit 2 as an upper unit. The second unit 2 is supported openably and closably by the hinge 3 with respect to the first unit 1. That is, the user can close or open the second unit 2 relative to the first unit 1 by pivoting the second unit 2 about the hinge 3. The second unit 2 is also a lid of the first unit 1.

A gap between the first unit 1 and the second unit 2 in a closed state forms a transport path for the original document. Although omitted in FIG. 5, the first unit 1 accommodates the transport unit 40, and the transport unit 40 transports the original document in the transport path. The first unit 1 accommodates the AFE substrate 30 and the second unit 2 accommodates the sensor substrate 20. Then, the FFC 50 couples the sensor substrate 20 and the AFE substrate 30 in a state where the FFC 50 extends through the hinge 3. Although not described in detail, for example, a slit is formed at the hinge 3 with a cylindrical shape, and the FFC 50 extends through the inside and outside of the hinge 3 by extending through this slit.

The FFC 50 consisting of the plurality of layers may be in a form in which two FFC are overlapped as illustrated in FIG. 4A or FIG. 4B, while a structure may be used in which one FFC is folded at a cut facing in the longitudinal direction and overlapped so that the width is ½ or ⅓ of the width than the original width (hereinafter, referred to as a folded layer structure). In particular, when the FFC 50 is coupled between boards through a particular narrow location of a component, such as the hinge 3, the narrower the width of the FFC 50 facilitates the product assembly. Thus, the FFC 50 illustrated in FIG. 5 is assumed to be the folded layer structure. In FIG. 5, the FFC 50 is described as a double line to indicate that the FFC 50 consists of two layers.

As illustrated in FIG. 5, in the FFC 50, the plurality of layers are bound together by a binding member 4 between the hinge 3 and the sensor substrate 20, and the plurality of layers are bound by the binding member 4 between the hinge 3 and the AFE substrate 30. The binding member 4 is, for example, a binding band or tape. By binding the plurality of layers constituting the FFC 50 with the binding member 4, the misalignment between the layer and the layer an be prevented. More specifically, the misalignment between the read signal line belonging to one layer and the lead wire belonging to the other layer and serving as the return path of the read signal line can be prevented. Furthermore, by binding the plurality of layers constituting the FFC 50 with the binding member 4, workability in the product assembling step is improved.

Figure 6:
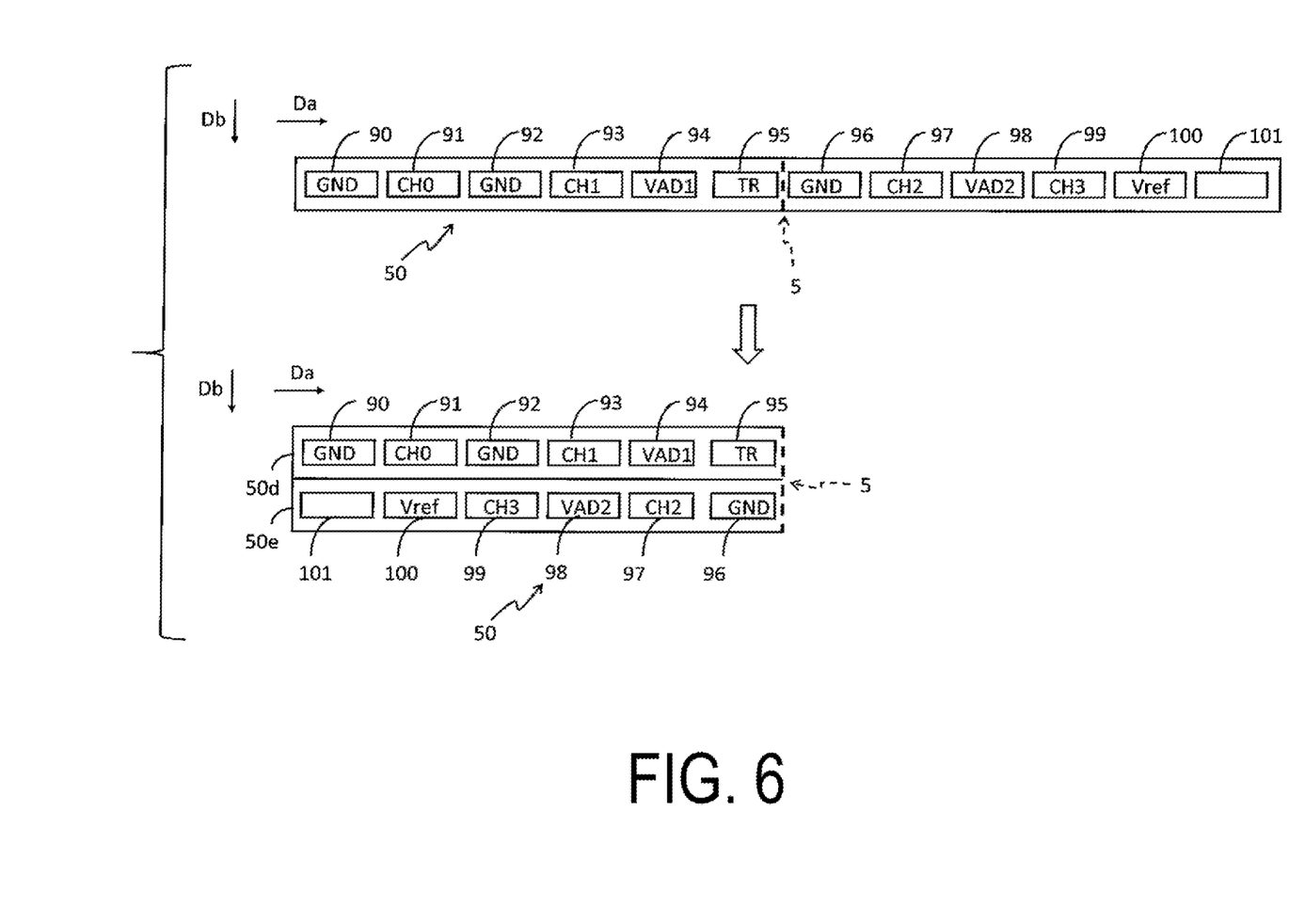
FIG. 6 is a cross-sectional view for illustrating a folded layer structure of the FFC.

FIG. 6 is an example of a cross-sectional view of the FFC 50 from the same perspective as FIGS. 4A and 4B, illustrating the folded layer structure. In FIG. 6, the FFC 50 prior to bending is illustrated in the upper row in the drawing, and the FFC 50 after bending is illustrated in the bottom row in the drawing. As indicated by reference numeral 90, 91, 92, 93, 94, 95, 96, 97, 98, 99, 100, 101, the FFC 50 has 12 lead wires 90~101 arranged in the width direction Da. In the configuration of FIG. 6, as in FIG. 2 and FIGS. 4A and 4B, a portion of the lead wire that has been traditionally the ground line is changed to the third lead wire such as the power supply line.

A "cut line 5", illustrated in broken lines, is formed at a position substantially in the middle of the FFC 50 prior to bending and where the lead wire does not extend. The cut line 5 is longitudinally continuous of the FFC 50. The operator folds the FFC 50 around the cut line 5. As a result, as illustrated in the bottom row in FIG. 6, the FFC 50 has the folded layer structure in which the first layer 50*d* and the second layer 50*e* overlap with each other. The overlapped first layer 50*d* and second layer 50*e* may be completely cut at the cut line 5, or may be partially coupled. According to the folded layer structure in FIG. 6, the width of FFC 50 is approximately ½ prior to bending.

Figure 7:
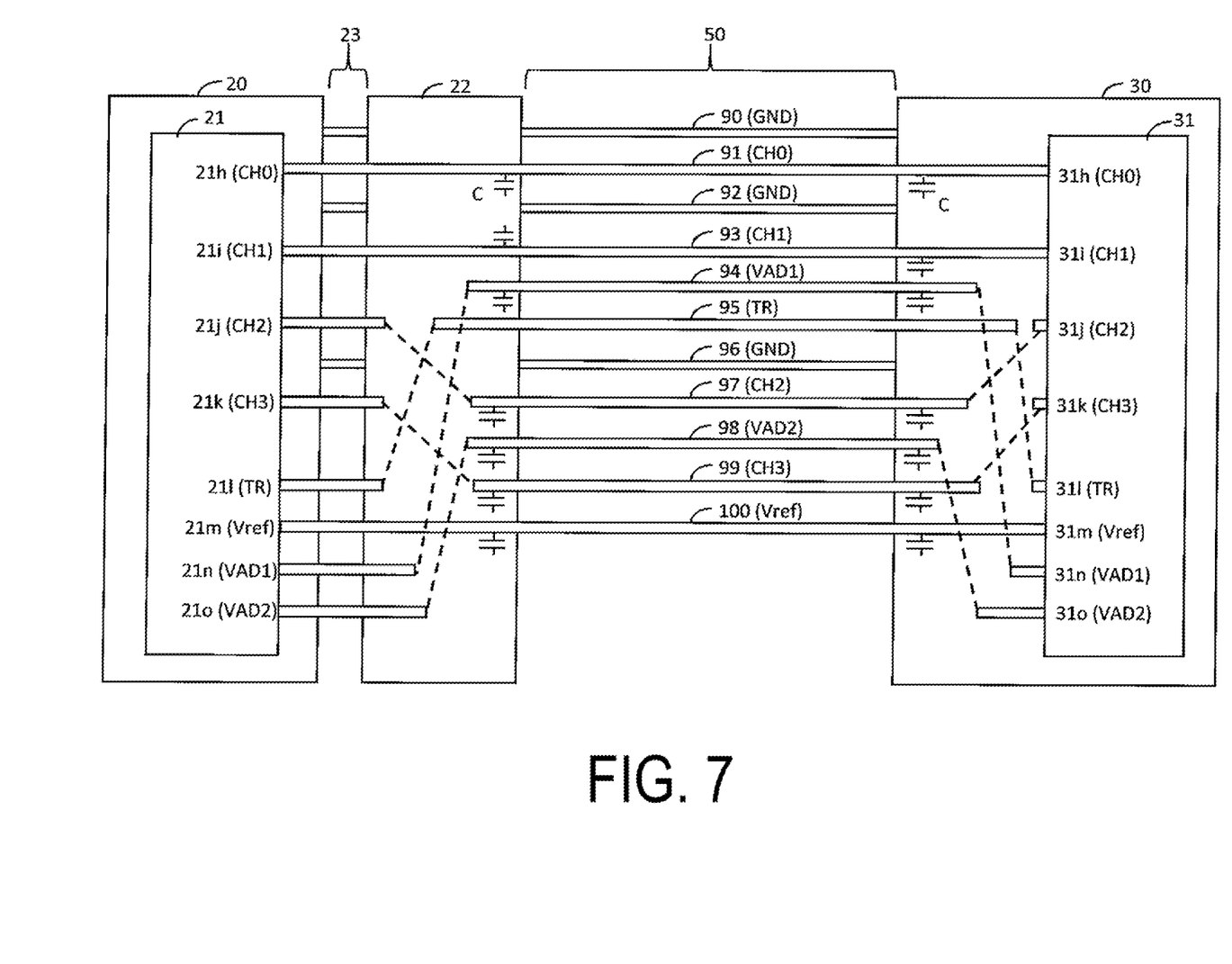
FIG. 7 is a diagram illustrating a wiring method using the FFC with the folded layer structure.

FIG. 7 is a diagram illustrating a wiring method using the FFC 50 of the folded layer structure of FIG. 6. As for the view of FIG. 7, basically, the view of FIG. 2 may be followed. One end of the FFC 50 is coupled to the AFE substrate 30 and the other end of the FFC 50 is coupled to the sensor substrate 20 via a relay substrate 22. The relay substrate 22 is accommodated in the second unit 2 together with the sensor substrate 20. The relay substrate 22 and the sensor substrate 20 are coupled by a cable 23. When the relay substrate 22 is located in the second unit 2, the plurality of layers constituting the FFC 50 are bound by the binding member 4 between the hinge 3 and the relay substrate 22.

In FIG. 7, the lead wires 90~100 are described as being entirely visible, but in reality, the FFC 50 has the folded layer structure as illustrated in the bottom row in FIG. 6. However, the FFC 50 does not have the folded layer structure over the entire length from the one end to the other end of the FFC 50, while the vicinity of the one end coupled to the AFE substrate 30 and the vicinity of the other end coupled to the relay substrate 22 are configured as a single layer as illustrated in the top row in FIG. 6. Moreover, the lead wire 101 illustrated in FIG. 6 is substantially unnecessary, and thus is not illustrated in FIG. 7.

In FIG. 7, as well as FIG. 2, a signal for the role or transmission of each lead wire is also described next to the reference numeral of each lead wire. This description is of course consistent with the wire-to-lead wire description of FIG. 6. Additionally, in FIG. 7, a signal to be input or output is also described next to each terminal of the AFE 31 and the reference numeral of each terminal of the sensor 21. Each of the lead wires 90, 92, 96 is a ground (GND) line. Each ground line is coupled to a ground pattern having the relay substrate 22 and the AFE substrate 30. Although not illustrated, the relay substrate 22 has a ground pattern in a required range, similar to the sensor substrate 20 and the AFE substrate 30. Because the ground pattern of the relay substrate 22 is electrically coupled to the ground pattern of the sensor substrate 20, coupling to the ground pattern of the relay substrate 22 is the same as coupling to the ground pattern of the sensor substrate 20.

Each of the lead wires 91, 93, 97, 99 is the read signal line of CH0, CH1, CH2, CH3. In the AFE substrate 30, the lead wire 91 is coupled to the signal terminal 31$h$ of CH0 of the AFE 31 via a predetermined pattern, and the lead wire 93 is coupled to the signal terminal 31$i$ of CH1 of the AFE 31 via a predetermined pattern. In addition, in the AFE substrate 30, the lead wire 97 is coupled to the signal terminal 31$j$ of CH2 of the AFE 31 via a predetermined pattern, and the lead wire 99 is coupled to the signal terminal 31$k$ of CH3 of the AFE 31 via a predetermined pattern. In order to achieve a correspondence relationship between the lead wires 91, 93, 97, 99 and CH0, CH1, CH2, and CH3 illustrated in FIG. 6, 7, in the AFE substrate 30, the signal terminal 31$j$ and the lead wire 97 are coupled, and the signal terminal 31$k$ and the lead wire 99 are coupled as indicated by the dashed lines. Each dashed line in FIG. 7 simply illustrates a portion of the pattern of the board, meaning that both ends of the dashed lines are electrically coupled.

Each of the lead wires 94, 98 is the power supply line that supplies the power supply voltages VAD1, VAD2. In order to achieve a correspondence relationship between the lead wires 94, 98 and the power supply voltages VAD1, VAD2 illustrated in FIG. 6, 7, in the AFE substrate 30, a power supply terminal 31$n$ of the AFE 31 and the lead wire 94 are coupled, and a power supply terminal 31$o$ of the AFE 31 and the lead wire 98 are coupled as indicated by the dashed lines, The lead wire 95 is a shift signal line that supplies the shift signal TR. In order to achieve a correspondence relationship between the lead wire 95 and the shift signal TR illustrated in FIG. 6, 7, in the AFE substrate 30, a shift terminal 31$l$ of AFE 31 and the lead wire 95 are coupled, as indicated by the dashed lines. The lead wire 100 is a reference supply line that supplies the reference voltage Vref, and is coupled to a reference terminal 31$m$ of the AFE 31 via a predetermined pattern in the AFE substrate 30.

According to FIG. 7, each read signal line, such as the lead wires 91, 93, 97, 99, is coupled to the ground pattern of the relay substrate 22 via the capacitor C, and is coupled to the ground pattern of the AFE substrate 30 via the capacitor C. Furthermore, each third lead wire (power supply line or reference supply line), which serves as the return path for the read signal lines, such as the lead wires 94, 98, 100, is coupled to the ground pattern of the relay substrate 22 via the capacitor C, and is coupled to the ground pattern of the AFE substrate 30 via the capacitor C.

According to FIG. 7, each of terminals 31$h$, 31$i$, 31$j$, 31$k$, 31$l$, 31$m$, 31$n$, 31$o$ of the AFE 31 and each of terminals 21$h$, 21$i$, 21$j$, 21$k$, 21$l$, 21$m$, 21$n$, 21$o$ of the sensor 21 have the same order of corresponding signals. On the other hand, in order to achieve a correspondence relationship between each lead wire and the signal in the FFC 50 illustrated in FIG. 6, 7, the correspondence relationship between each of the terminals 31$h$, 31$i$, 31$j$, 31$k$, 31$l$, 31$m$, 31$n$, 31$o$ of the AFE 31 and the lead wires of the FFC 50 was partially altered by the dashed pattern of the AFE substrate 30. Thus, each lead wire of the FFC 50 and each terminal 21$h$, 21$i$, 21$j$, 21$k$, 21$l$, 21$m$, 21$n$, 21$o$ of the sensor 21 do not partially match the sequence of corresponding signals. Thus, such a mismatch is eliminated in the relay substrate 22. In other words, the relay substrate 22 has a pattern that eliminates a difference between an arrangement order of each lead wire of the FFC 50 on a side of coupling with FFC 50 and an arrangement order of each coupling terminal (21$h$, 21$i$, 21$j$, 21$k$, 21$l$, 21$m$, 21$n$, 21$o$) in the sensor substrate 20. As illustrated in FIG. 7, the pattern included in the relay substrate 22 has a symmetrical arrangement with the pattern included in the AFE substrate 30, sandwiching the FFC 50.

According to the folded layer structure the FFC 50 illustrated in FIG. 6, 7, the lead wire 91, which is the read signal line of the first layer 50$d$, is sandwiched between the ground lines in the width direction Da, and overlaps with the lead wire 100, which is the reference supply line of the second layer 50$e$ in the thickness direction db. The lead wire 99, which is the read signal line of the second layer 50$e$, is sandwiched between the reference supply line and the power supply line in the width direction Da, and overlaps with the lead wire 92, which is the ground line of the first layer 50$d$ in the thickness direction db. The lead wire 93, which is the read signal line of the first layer 50$d$, is sandwiched between the ground line and the power supply line in the width direction Da, and overlaps with the lead wire 98, which is the power supply line of the second layer 50$e$ in the thickness direction db. The lead wire 97, which is the read signal line of the second layer 50$e$, is sandwiched between the power supply line and the ground line in the width direction Da, and overlaps with the lead wire 94, which is the power supply line of the first layer 50$d$ in the thickness direction db.

4. Summary:

Thus, according to the present exemplary embodiment, the image reading device 10 includes the sensor substrate 20 having the sensor 21 for image reading, the AFE substrate 30 having the AFE 31 for receiving and processing a read signal output from the sensor 21, the FFC 50 at which the plurality of lead wires are arranged in the width direction intersecting with the longitudinal direction, and configured to couple the sensor substrate 20 and the AFE substrate 30. Additionally, the FFC 50 includes a configuration in which the ground line that is one of the plurality of lead wires and coupled to the ground pattern included each in the sensor substrate 20 and the AFE substrate 30 is sandwiched between the first lead wire and the second lead wire that are the read signal lines among the plurality of lead wires that transmit the read signal from the sensor substrate 20 to the AFE substrate 30, and a configuration in which the third lead wire that is one of the plurality of lead wires and having a smaller voltage change than the read signal lines is sandwiched between two read signal lines that are at least one set other than the set of the first lead wire and the second lead wire among the plurality of lead wires. Each of the read signal lines is coupled to the ground pattern of the sensor substrate 20 via the capacitor C and is coupled to the ground pattern of the AFE substrate 30 via the capacitor C, and the third lead wire is coupled to the ground pattern of the sensor substrate 20 via the capacitor C and is coupled to the ground pattern of the AFE substrate 30 via the capacitor C.

According to the above configuration, the FFC 50 includes at least one configuration in which the third lead wire is sandwiched between the two read signal lines. As a result, the return path for the read signal line can be ensured by the third lead wire, and the number of the lead wires of the FFC 50 can be reduced compared to the traditional example, and it is possible to contribute to the miniaturization of the FFC 50 and the product using the FFC 50.

Further, according to the present exemplary embodiment, the third lead wire may be a lead wire that supplies the power supply voltage or the reference voltage to the sensor substrate 20.

According to the above configuration, the return path with respect to the read signal line can be ensured using a line required from an original source line, such as the power supply line or the reference supply line.

In addition, according to the present exemplary embodiment, the FFC 50 may consist of the plurality of layers overlapping in the thickness direction db that intersects with the longitudinal direction and the width direction, and may be disposed at a position where the third lead wire included in the second layer overlapping with the first layer of the plurality of layers overlaps with the read signal line included in the first layer of the plurality of layers.

According to the above configuration, when the FFC 50 is formed from the plurality of layers, the return path can also be ensured for the read signal line included in a layer by a third lead wire in another layer overlapping with this layer. In this manner, it is possible to appropriately suppress crosstalk and noise from the surroundings due to the read signal flowing through the read signal line.

In addition, according to the present exemplary embodiment, the image reading device 10 may include the first unit 1 that accommodates the AFE substrate 30, the second unit 2 that accommodates the sensor substrate 20, and the hinge 3 that supports openably and closably the second unit 2 with respect to the first unit 1. In this case, the FFC 50 couples the sensor substrate 20 and the AFE substrate 30 in a state where the FFC 50 extends through the hinge 3.

The above configuration facilitates assembly of the product by extending the FFC 50, which is configured by the plurality of layers, through the hinge 3.

In addition, according to the present exemplary embodiment, the FFC 50 may be configured that the plurality of layers may be bound together by a binding member 4 between the hinge 3 and the sensor substrate 20, and the plurality of layers may be bound by the binding member 4 between the hinge 3 and the AFE substrate 30.

According to the above configuration, the misalignment between the layers constituting the FFC 50 is prevented, and the workability of product assembly including the coupling of the boards by the FFC 50 is improved.

In addition, according to the present exemplary embodiment, the FFC 50 may include the spacer 50c between the layers constituting the plurality of layers.

According to the above configuration, the interlayer distance of the FFC 50 is ensured, and crosstalk and noise described above can be further reduced.

In addition, according to the present exemplary embodiment, the one end of FFC 50 and the AFE substrate 30 are coupled, the other end of the FFC 50 and the sensor substrate 20 are coupled via the relay substrate 22, and the relay substrate 22 has a pattern that eliminates the difference between the arrangement order of each lead wire of the FFC 50 on the side of coupling with the other end and the arrangement order of each coupling terminal in the sensor substrate 20.

According to the above configuration, due to the adoption of the plurality of layers of configuration for the FFC 50, even when the correspondence relationship between each coupling terminal and each lead wire is changed in the AFE substrate 30, the difference between the arrangement order of each lead wire of the FFC 50 and the arrangement order of each coupling terminal of the sensor substrate 20 can be eliminated by the relay substrate 22.

However, the method of coupling the other end of the FFC 50 and the sensor substrate 20 via the relay substrate 22, and eliminating the difference between the arrangement order of each lead wire of the FFC 50 and the arrangement order of each coupling terminal of the sensor substrate 20 by the relay substrate 22 can be applied to a case where the FFC 50 is a single layer.

In various aspects of the FFC 50 described above, a surface of the FFC 50 may be covered with a metal shielding layer. For example, a metal such as aluminum is deposited on the surface of the FFC 50 to cover at least a portion of the surface.

This makes it possible to further improve the noise suppression on the read signal.

The present exemplary embodiment also discloses an disclosure of a category other than the image reading device 10.

In the wiring method for coupling the sensor substrate 20 having the sensor 21 for image reading and the AFE substrate 30 having the AFE 31 configured to receive and process the read signal output from the sensor 21 with the FFC 50 configured by the plurality of lead wires arranged in the width direction intersecting with the longitudinal direction, the FFC 50 has a configuration in which the ground line that is one of the plurality of lead wires and coupled to the ground pattern included each in the sensor substrate 20 and the AFE substrate 30 is sandwiched between the first lead wire and the second lead wire that are the read signal lines among the plurality of lead wires that transmit the read signal from the sensor substrate 20 to the AFE substrate 30, and a configuration in which the third lead wire that is one of the plurality of lead wires and having a smaller voltage change than the read signal lines is sandwiched between two read signal lines that are at least one set other than the set of the first lead wire and the second lead wire among the plurality of lead wires. Then, each of the read signal wires is coupled to the ground pattern of the sensor substrate 20 via the capacitor C and is coupled to the ground pattern of the AFE substrate 30 via the capacitor C, and the third lead wire is coupled to the ground pattern of the sensor substrate 20 via the capacitor C and is coupled to the ground pattern of the AFE substrate 30 via the capacitor C.

Furthermore, it can be said that the present exemplary embodiment including the wiring method discloses a wiring structure including the FFC 50 and a method of manufacturing the image reading device 10 having the wiring structure.

What is claimed is:

1. An image reading device comprising:
a sensor substrate including a sensor for image reading;
an AFE substrate including an analog front end configured to receive and process a read signal output from the sensor; and
a flexible flat cable including a plurality of lead wires arranged in a width direction intersecting with a longitudinal direction, the flexible flat cable being configured to couple the sensor substrate and the AFE substrate, wherein the plurality of lead wires includes a first lead wire and a second lead wire that are signal lines configured to transmit the read signal from the sensor substrate to the AFE substrate, a third lead wire having a smaller voltage change than the signal lines, a fourth lead wire and a fifth lead wire that are signal lines configured to transmit the read signal from the sensor substrate to the AFE substrate, and a ground line coupled to a ground pattern of the sensor substrate and a ground pattern of the AFE substrate, the ground line is provided between the first lead wire and the second lead wire, the third lead wire is provided between the second lead wire and the fourth lead wire, or between the fourth lead wire and the fifth lead wire, each of the signal lines is coupled to the ground pattern of the sensor substrate via a capacitor and is coupled to the ground pattern of the AFE substrate via a capacitor, and the third lead wire is coupled to the ground pattern of the sensor substrate via a capacitor and is coupled to the ground pattern of the AFE substrate via a capacitor wherein the flexible flat cable includes a plurality of layers overlapping in a thickness direction that intersects with the longitudinal direction and the width direction, and is disposed at a position where the third lead wire included in a second layer of the plurality of layers overlapping with a first layer of the plurality of layers overlaps with one of the signal lines included in the first layer of the plurality of layers.

2. The image reading device according to claim 1, wherein the third lead wire is a lead wire configured to supply a power supply voltage or a reference voltage to the sensor substrate.

3. The image reading device according to claim 1, comprising:

a first unit configured to accommodate the AFE substrate;

a second unit configured to accommodate the sensor substrate; and a hinge configured to openably and closably support the second unit with respect to the first unit, wherein the flexible flat cable is configured to couple the sensor substrate and the AFE substrate in a state where the flexible flat cable extends through the hinge.

4. The image reading device according to claim 3, wherein the plurality of layers of the flexible flat cable are bound together by a first binding member between the hinge and the sensor substrate, and the plurality of layers are bound by a second binding member between the hinge and the AFE substrate.

5. The image reading device according to claim 1, wherein the flexible flat cable includes a spacer between the first and second layers constituting the plurality of layers.

6. The image reading device according to claim 1, wherein one end of the flexible flat cable and the AFE substrate are coupled, another end of the flexible flat cable and the sensor substrate are coupled via a relay substrate, and the relay substrate includes a pattern configured to eliminate a difference between an arrangement order of each lead wire of the flexible flat cable on a side of coupling with the other end and an arrangement order of each coupling terminal at the sensor substrate.

7. A wiring method for coupling, with a flexible flat cable, a sensor substrate including a sensor for image reading and an AFE substrate including an analog front end configured to receive and process a read signal output from the sensor, the flexible flat cable being configured by a plurality of lead wires arranged in a width direction intersecting with a longitudinal direction, wherein the plurality of lead wires includes a first lead wire and a second lead wire that are signal lines configured to transmit the read signal from the sensor substrate to the AFE substrate, a third lead wire having a smaller voltage change than the signal lines, a fourth lead wire and a fifth lead wire that are signal lines configured to transmit the read signal from the sensor substrate to the AFE substrate, and a ground line coupled to a ground pattern of the sensor substrate and a ground pattern of the AFE substrate, the ground line is configured to be provided between the first lead wire and the second lead wire, the third lead wire is configured to be provided between the second lead wire and the fourth lead wire, or between the fourth lead wire and the fifth lead wire, each of the signal lines is coupled to the ground pattern of the sensor substrate via a capacitor, and is coupled to the ground pattern of the AFE substrate via a capacitor; and the third lead wire is coupled to the ground pattern of the sensor substrate via a capacitor, and is coupled to the ground pattern of the AFE substrate via a capacitor, wherein the flexible flat cable includes a plurality of layers overlapping in a thickness direction that intersects with the longitudinal direction and the width direction, and is disposed at a position where the third lead wire included in a second layer of the plurality of layers overlapping with a first layer of the plurality of layers overlaps with one of the signal lines included in the first layer of the plurality of layers.

8. An image reading device comprising:

a sensor substrate including a sensor for image reading;

an AFE substrate including an analog front end configured to receive and process a read signal output from the sensor; and a flexible flat cable including a plurality of lead wires arranged in a width direction intersecting with a longitudinal direction, the flexible flat cable being configured to couple the sensor substrate and the AFE substrate, wherein the plurality of lead wires includes a first lead wire and a second lead wire that are signal lines configured to transmit the read signal from the sensor substrate to the AFE substrate, a third lead wire having a smaller voltage change than the signal lines, a fourth lead wire and a fifth lead wire that are signal lines configured to transmit the read signal from the sensor substrate to the AFE substrate, and a ground line coupled to a ground pattern of the sensor substrate and a ground pattern of the AFE substrate, the ground line is provided between the first lead wire and the second lead wire, the third lead wire is provided between the second lead wire and the fourth lead wire, or between the fourth lead wire and the fifth lead wire, each of the signal lines is coupled to the ground pattern of the sensor substrate via a capacitor and is coupled to the ground pattern of the AFE substrate via a capacitor, and the third lead wire is coupled to the ground pattern of the sensor substrate via a capacitor and is coupled to the ground pattern of the AFE substrate via a capacitor, wherein one end of the flexible flat cable and the AFE substrate are coupled, another end of the flexible flat cable and the sensor substrate are coupled via a relay substrate, and the relay substrate includes a pattern configured to eliminate a difference between an arrangement order of each lead wire of the flexible flat cable on a side of coupling with the other end and an arrangement order of each coupling terminal at the sensor substrate.

* * * * *